United States Patent
Müller et al.

(10) Patent No.: US 8,886,232 B2
(45) Date of Patent: Nov. 11, 2014

(54) PAGING IN A RADIO ACCESS NETWORK, SUCH AS AN E-UTRAN

(75) Inventors: Walter Müller, Upplands Väsby (SE); Gunnar Mildh, Sollentuna (SE); Erik Dahlman, Bromma (SE); Vera Vukajlovic, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 544 days.

(21) Appl. No.: 12/680,328

(22) PCT Filed: May 12, 2008

(86) PCT No.: PCT/SE2008/050541
§ 371 (c)(1),
(2), (4) Date: Mar. 26, 2010

(87) PCT Pub. No.: WO2006/138625
PCT Pub. Date: Dec. 28, 2006

(65) Prior Publication Data
US 2010/0248750 A1    Sep. 30, 2010

Related U.S. Application Data

(60) Provisional application No. 60/975,533, filed on Sep. 27, 2007.

(51) Int. Cl.
*H04W 68/00*    (2009.01)
*H04W 68/02*    (2009.01)
*H04W 52/02*    (2009.01)

(52) U.S. Cl.
CPC .......... *H04W 68/02* (2013.01); *H04W 52/0216* (2013.01)
USPC ........ 455/458; 455/426.1; 455/515; 370/349; 370/389

(58) Field of Classification Search
USPC ............... 455/426.1, 458, 515; 370/349, 389, 370/392, 471–476
See application file for complete search history.

(56) References Cited

U.S. PATENT DOCUMENTS

| | | | |
|---|---|---|---|
| 6,477,382 B1 * | 11/2002 | Mansfield et al. ............ | 455/458 |
| 2005/0181731 A1 | 8/2005 | Asghar et al. | |
| 2005/0282528 A1 | 12/2005 | Charpentier et al. | |
| 2008/0188247 A1 * | 8/2008 | Worrall ......................... | 455/458 |
| 2008/0247337 A1 * | 10/2008 | Li et al. ......................... | 370/280 |

FOREIGN PATENT DOCUMENTS

| WO | WO 01/50805 A1 | 7/2001 |
|---|---|---|
| WO | WO 02/47417 A1 | 6/2002 |
| WO | WO 2006/138625 A2 | 12/2006 |
| WO | WO 2007/078172 A2 | 7/2007 |

OTHER PUBLICATIONS

LG Electronics, "Transmission of LTE Paging", Kobe Japan May 7-11, 2007.*

(Continued)

*Primary Examiner* — Wayne Cai

(57) ABSTRACT

The present invention relates to methods and arrangements of a network node and a UE of a radio access network supporting discontinuous reception, offering a solution that is based on the idea to use more than one sub frame for transmitting paging messages when needed. An indicator in a sub frame with paging messages indicates to the receiving UE if the subsequent sub frame should be read as well.

20 Claims, 5 Drawing Sheets

(56) References Cited

OTHER PUBLICATIONS

IP Wireless, et al. Paging Group Indication. 3GPP TSG RAN WG#59 R2-073187. Jun. 20-24, 2007.
Qualcomm. Paging Procedure. . 3GPP TSG RAN WG#52 R2-060994. Mar. 27-31, 2006.
Siemens. Adaptive DRX Setting for LTE Paging. 3GPP TSG RAN WG#55 R2-062818. Oct. 9-13, 2006.
Ericsson. Paging in LTE. 3GPP TSG RAN WG#59bis R2-074202. Oct. 8-12, 2007.

* cited by examiner

PAGING IN A RADIO ACCESS NETWORK, SUCH AS AN E-UTRAN

RELATED APPLICATIONS

This application claims the benefit of U.S. Continuation Application No. 60/975,533 filed Sep. 27, 2007, the disclosure of which is fully incorporated herein by reference.

TECHNICAL FIELD

The present invention relates to methods and arrangements in a wireless communication system, in particular to methods and arrangements for paging user equipments applying discontinuous reception (DRX).

BACKGROUND

The Universal Mobile Telecommunication System (UMTS) is one of the third generation mobile communication technologies designed to succeed GSM. 3GPP Long Term Evolution (LTE) is a project within the 3rd Generation Partnership Project (3GPP) to improve the UMTS standard to cope with future requirements in terms of improved services such as higher data rates, improved efficiency, lowered costs etc. UMTS Terrestrial Radio Access Network (UTRAN) is the radio network of a UMTS system and evolved UTRAN (E-UTRAN) is the radio network of a LTE system. The radio base station in E-UTRAN is called evolved NodeB (eNB).

An E-UTRAN typically comprises user equipments (UE) 150 wirelessly connected to radio base stations 130a-c as illustrated in FIG. 1. The radio base stations 130a-c are directly connected to the core network (CN) 100. In addition, the radio base stations are also connected to each other. In contrast, in an UTRAN the radio base stations are connected to the CN via a Radio Network Controller (RNC), wherein each RNC controls the connected radio base stations.

Discontinuous reception (DRX) is a method used in wireless communication systems, e.g. LTE, to enable a reduced power consumption of the UE. In idle mode e.g., the UE and the network are coordinated in terms of having the same information about how and in what phases the data transfer happens. This means that during the other phases (when no data transfer happens) the UE receiver functionality can be switched off and can thus enter a low power state, hereinafter called sleep mode. FIG. 2 illustrates that the UE receiver only wakes up during short regularly occurring periods (once in each DRX cycle 202) known as paging occasions 201 to receive a sub frame. During these paging occasions the UE checks for paging messages in the sub frame.

FIG. 3 illustrates the basic downlink sub frame structure as defined in E-UTRAN. Each sub frame 300 of length 1 ms consists of two parts: A control part 301 during which Physical Downlink Control Channels (PDCCH) are transmitted, and a data part 302 during which Downlink Shared Channel (DL-SCH) are transmitted. Each PDCCH typically carries control information to a single UE when it is in active mode. This control information informs the UE how to receive and decode corresponding information on the Downlink Shared Channel (DL-SCH). What UE the PDCCH is directed to is indicated by a Radio Network Temporary Identifier (RNTI) included in the PDCCH.

The sub frame structure with its control and data fields is also assumed to be used for paging, but one difference is that a sub frame comprising paging messages can be directed to more than one UE. The time between paging occasions, i.e. the sleep-mode or DRX cycle, typically spans a large number of sub frames, e.g. 320 sub frames or a multiple of 320 sub frames. When a UE wakes up, it first receives and decodes the control part of the sub frame. If one of the PDCCHs in the control part includes an identifier indicating that the data part of the sub frame includes one or multiple paging messages, the UE proceeds to receive and decode the DL-SCH in the data part to find out if one of the paging messages was directed to this specific UE. The identifier in the control part can be described as a specific RNTI, which can be referred to as a Paging RNTI (P-RNTI). The P-RNTI is thus just an indication to all UEs addressed at that paging occasion that there are paging messages to read, but it does not say anything about to which UEs the paging messages are directed. If the UE determines that no paging message in the data part was directed to it, it can return to sleep mode again. If no P-RNTI is present in the control part of the sub frame, the UE can return to sleep mode immediately after decoding the control part, i.e. the UE does not need to read the data part of the sub frame.

Paging is capacity demanding for the system, as paging messages need to reach all UEs in a cell. The transmission of paging messages cannot be adapted for a specific UE as it is addressed to all UEs that listen for paging at the same paging occasion, and in the worst of cases UEs can be close to the cell border and thus far away from the radio base station (e.g. the eNB in E-UTRAN). To be sure to reach all UEs the transmit power needs to be set to a maximum (the level needed to reach UEs at the cell border), which means a low data rate and affects the number of paging messages that can be carried by one sub frame. The bigger the cell is, the more capacity demanding is the paging and the less amount of UEs can be paged in one sub frame.

If several UEs wake up from there sleep mode at the same time, i.e. if their paging occasions coincide, there might be a need to transmit multiple paging messages to the different UEs in the same sub frame. However, especially in case of narrowband transmissions with limited data rates on the Downlink Shared Channel (DL-SCH), it may not be possible to include all these paging messages within the data part of a single sub frame. This situation is hereafter referred to as overflow. An overflow situation is handled by waiting for the next paging occasion to transmit the rest of the paging messages. Overflow thus implies a delay in the paging.

To minimize the delay for paging, a network operator can adapt the DRX cycle. With a shorter DRX cycle the delay at overflow will be shorter, as the time to the next paging occasion is shorter. Another aspect is that a shorter DRX cycle will give more paging occasions per time unit which leads to fewer paging messages per paging occasion and thus a lower risk for overflow. The disadvantage of shorter DRX cycles is an increased UE power consumption as the UE has to wake up for paging more often.

SUMMARY

The object of the present invention is to achieve methods and arrangements that obviate at least some of the above disadvantages and improve the paging performance without significantly affecting the UE power consumption.

This is achieved by a solution that is based on the idea to use more than one sub frame for transmitting the paging messages. An indicator in a sub frame with paging messages indicates to the receiving UE if the subsequent sub frame should be read as well.

Thus in accordance with a first aspect of the present invention, a method for paging for a radio access network providing communication services to at least one user equipment is provided. The network and the user equipment support discontinuous reception, and a sub frame used for paging messages comprises a control part and a data part. The method comprises the steps of transmitting paging messages in the data part of a first sub frame, and when the data rate of the first sub frame is not high enough for transmitting all the paging messages, a further paging message is transmitted in the data part of a sub frame subsequent to the first sub frame. The method further comprises the step of indicating by an indicator in the first sub frame if the control part of the sub frame subsequent to the first sub frame should be decoded or not.

In accordance with a second aspect of the present invention, a method for paging for a UE of a radio access network is provided. The user equipment and the network support discontinuous reception, and a sub frame used for paging messages comprises a control part and a data part. The method comprises the steps of receiving a first sub frame comprising paging messages in the data part and an indicator indicating if the control part of a sub frame subsequent to the first sub frame should be decoded or not, and decoding the indicator. The method further comprises the step of receiving and decoding the control part of the sub frame subsequent to the first sub frame if the indicator indicates so. On the other hand if the indicator indicates that the control part of the sub frame subsequent to the first sub frame should not be decoded, then the UE goes to sleep mode.

In accordance with a third aspect of the present invention, a network node of a radio access network, such as an eNB, providing communication services to at least one user equipment is provided. The network and the user equipment support discontinuous reception, and a sub frame used for paging messages comprises a control part and a data part. The network node comprises means for transmitting paging messages in the data part of a first sub frame. It also comprises means for transmitting a further paging message in the data part of a sub frame subsequent to the first sub frame, which is done if the data rate of the first sub frame is not high enough for transmitting all the paging messages. The network node further comprises means for indicating by an indicator in the first sub frame if the control part of the sub frame subsequent to the first sub frame should be decoded or not.

In accordance with a fourth aspect of the present invention, a UE of a radio access network is provided. The UE and the network support discontinuous reception and a sub frame used for paging consists of a control part and a data part. The UE comprises means for receiving a first sub frame comprising paging messages in the data part and an indicator indicating if the control part of a sub frame subsequent to the first sub frame should be decoded or not, and means for decoding the indicator. It further comprises means for receiving and decoding the control part of the sub frame subsequent to the first sub frame, which is done when the indicator indicates that the control part of the sub frame subsequent to the first sub frame should be decoded. It also comprises means for going to sleep mode, which is done when the indicator indicates that the control part of the sub frame subsequent to the first sub frame should not be decoded.

An advantage of embodiments of the present invention is that they allow for a dynamic extension of the paging capacity and thus eliminates the overflow problem with no, or very little, impact on the UE power consumption.

DETAILED DESCRIPTION

In the following, the invention will be described in more detail with reference to certain embodiments and to accompanying drawings. For purposes of explanation and not limitation, specific details are set forth, such as particular architectures, scenarios, techniques, etc., in order to provide a thorough understanding of the present invention. However, it will be apparent to one skilled in the art that the present invention may be practised in other embodiments that depart from these specific details.

The 3GPP E-UTRAN system is used as an exemplary radio access network where the present invention is applied. However, the invention can be applied to any radio access network that has similar characteristics e.g. in terms of paging and DRX.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

Figure 1:
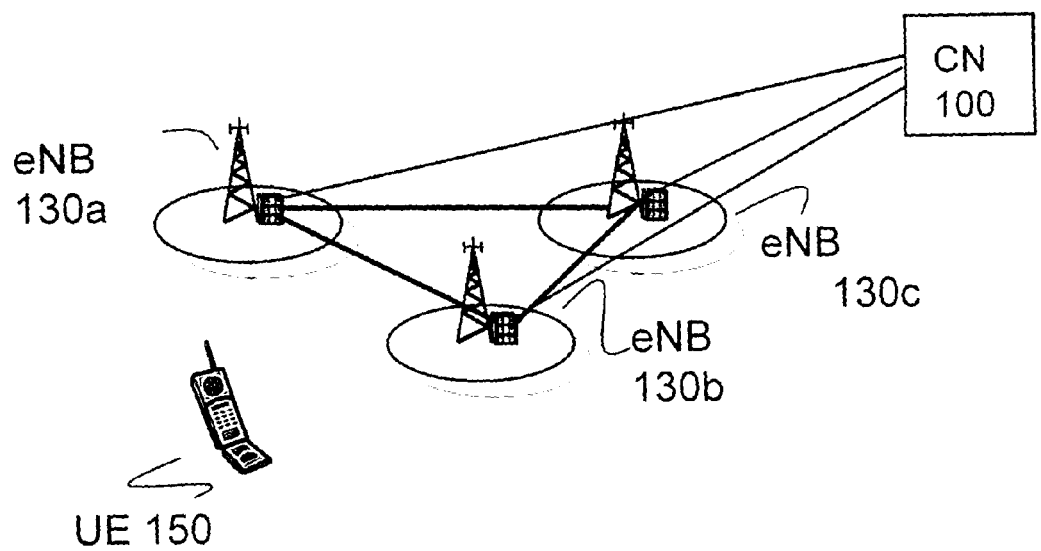
FIG. 1 illustrates a wireless communication system wherein the present invention may be implemented.
Figure 2:
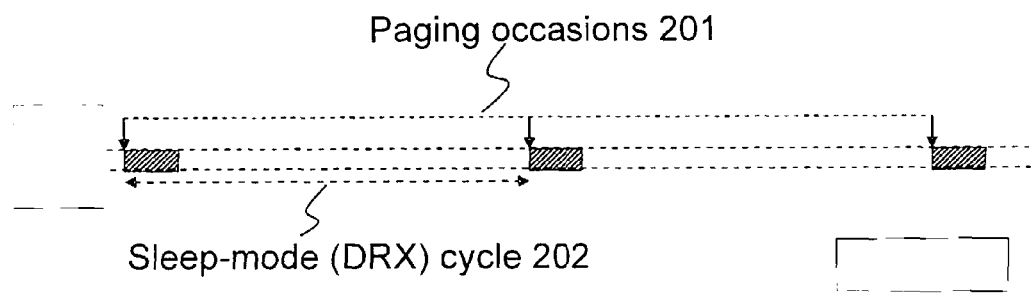
FIG. 2 illustrates a "sleep mode" (DRX) cycle with paging occasions for a user equipment according to prior art.
Figure 3:
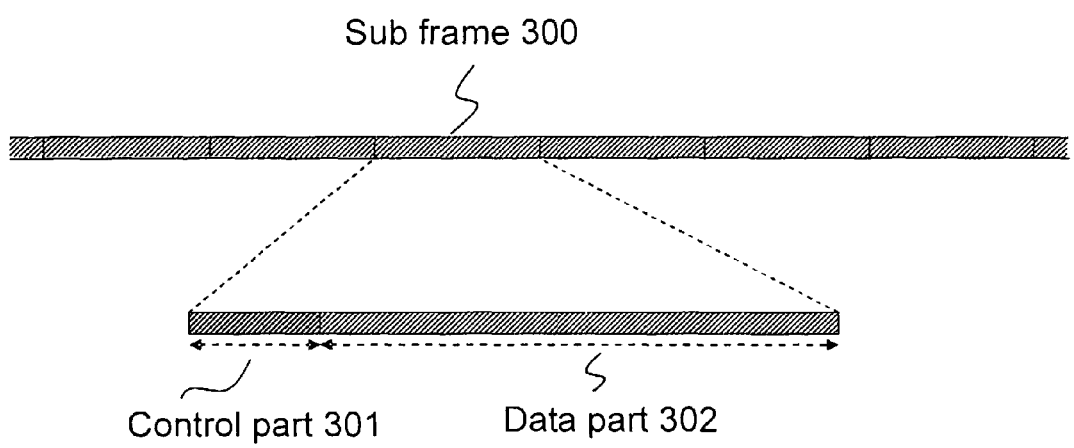
FIG. 3 illustrates the basic downlink sub frame structure in E-UTRAN according to prior art.

The present invention relates to paging in a radio access network, such as an E-UTRAN as illustrated in FIG. 1, providing communication services to one or more UEs, where the system and the UEs support DRX. Conventionally, paging messages can only be transmitted during one single sub frame at the paging occasions. Sometimes the data rate of one single sub frame is not enough for sending all the paging messages needed. A so called overflow situation occurs. In a conventional solution such an overflow situation is handled by waiting for the next paging occasion to transmit the rest of the paging messages. This will thus give an delay at overflow of one DRX cycle (one DRX cycle is 320 sub frames or a multiple of 320 sub frames, i.e. 320 ms, 640 ms, 1280 ms, etc.) in the paging of certain UEs. In the present invention the idea is instead to make it possible for the eNB to transmit paging messages during more than one sub frame when this is needed (i.e. in the sub frame of the paging occasion and in subsequent sub frames as well), and to use an indicator to indicate if further paging messages should be checked for in the subsequent sub frames. This will thus give a much shorter delay at overflow of typically one sub frame only (i.e. 1 ms), and the delay is thus not at all coupled to the length of the DRX cycle.

The time period during which a UE is awake for the paging occasion is longer than just the time period needed to receive and decode one sub frame, as the actual powering up and down of the UE takes time and as there are also other measurements done at the same time. This means that the time needed to read a second sub frame subsequent to the first sub frame of a paging occasion is relatively short, in comparison with the total time that the UE is awake for the paging occasion. When also taking into consideration that this only occurs in an overflow situation, the extra power consumption in the UE in the present invention can be considered to be very limited.

Another aspect of the power consumption of the UE in relation to the present invention is that, as the overflow situation is handled in such a way that the delay at overflow does not depend on the DRX cycle, it will be possible for the operator to prolong the DRX cycle without risking to prolong paging delays. A longer DRX cycle will lead to lower UE power consumption for all UEs. An alternative to prolonging the DRX cycle and saving UE power is to keep the same DRX cycle and instead focus on minimising the number of lost pages (defined as paging messages that cannot be decoded by the addressed UE for transmission quality reasons). A short DRX cycle will generally enable a more robust coding of the paging messages, as there will be less paging messages per paging occasion, and this will in turn give less problems with lost pages.

Figure 4:
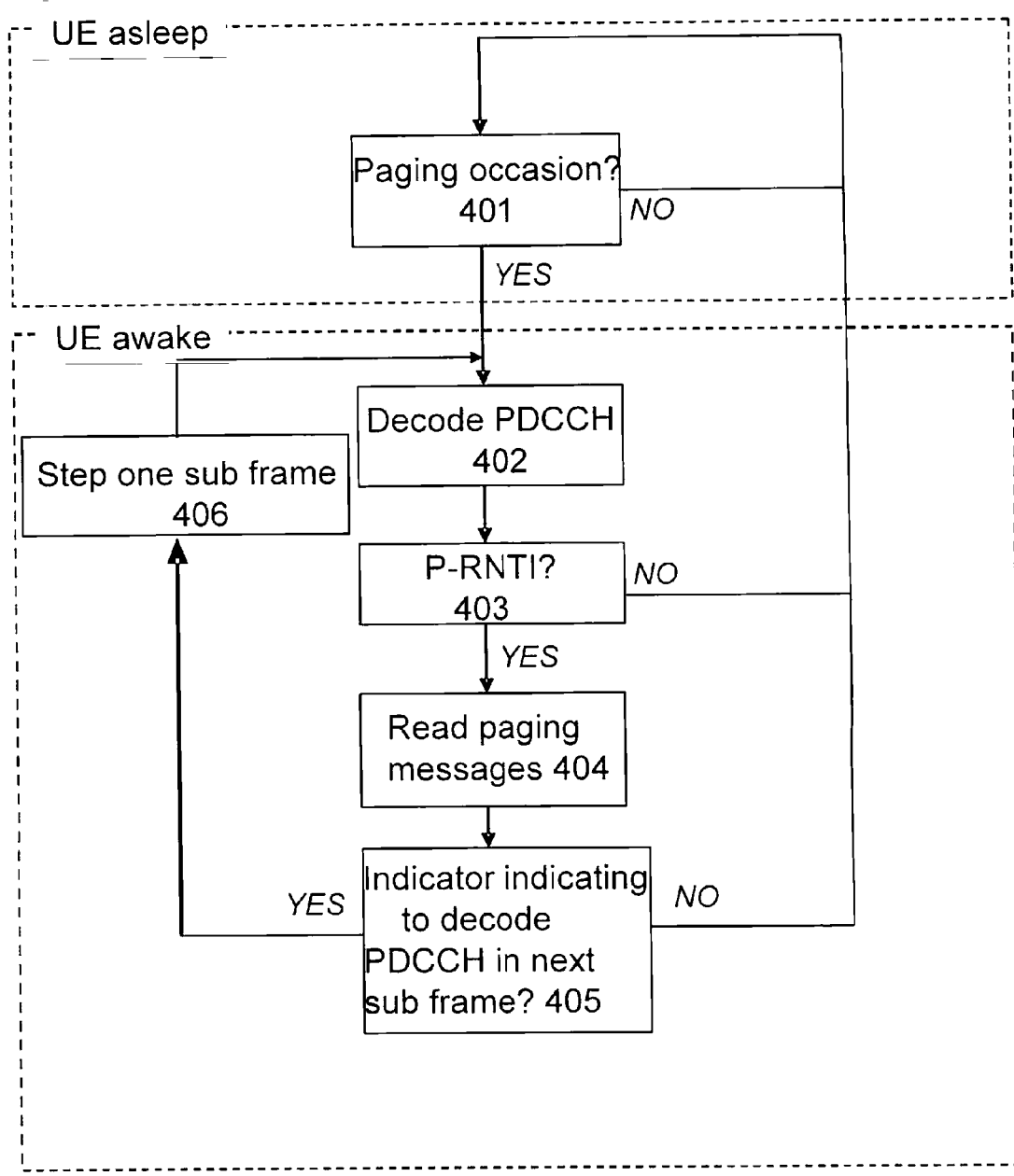
FIG. 4 is a flowchart illustrating the paging method of a UE in E-UTRAN according to one embodiment of the present invention.

FIG. 4 illustrates the paging method in a UE in E-UTRAN according to one embodiment of the invention. A UE in sleep mode (UE asleep) wakes up 401/YES to receive the sub frame corresponding to the paging occasion. In such sub frames the UE first receives and decodes the PDCCHs 402 within the control part of the sub frame. If no decoded PDCCH includes a P-RNTI 403/NO, the UE returns back to the sleep mode. If a decoded PDCCH includes a P-RNTI 403/YES, the user equipment reads 404 the corresponding paging message(s) on the DL-SCH in the data part of the sub frame. The data part of the sub frame is thus only read if there is a P-RNTI in the control part. The steps described above, denoted 401-404, correspond to a conventional paging method, in which the UE goes back to sleep after the step denoted 404 of FIG. 4. The following steps, denoted 405-406, are the ones added according to embodiments of the present invention, and they start with a check of the indicator. If the decoded PDCCH includes an indicator indicating that the PDCCH of the next sub frame shall not be decoded 405/NO, the UE returns to sleep mode and waits for the next paging occasion. This is thus the case when all paging messages could fit into one single sub frame. If, however, the decoded PDCCH includes an indicator indicating that the PDCCH of the control part of the next sub frame shall be decoded 405/YES, the user equipment steps one sub frame 406 and reads the PDCCH of the next sub frame 401. This is thus the case of an overflow situation, when an extension of the paging capacity is needed. The loop visualised in FIG. 4 can then continue until the paging messages have all been transmitted. As a last step, the decoded PDCCH will include an indicator indicating that the PDCCH of the next sub frame shall not be decoded, and the UE can go to sleep mode.

Figure 5:
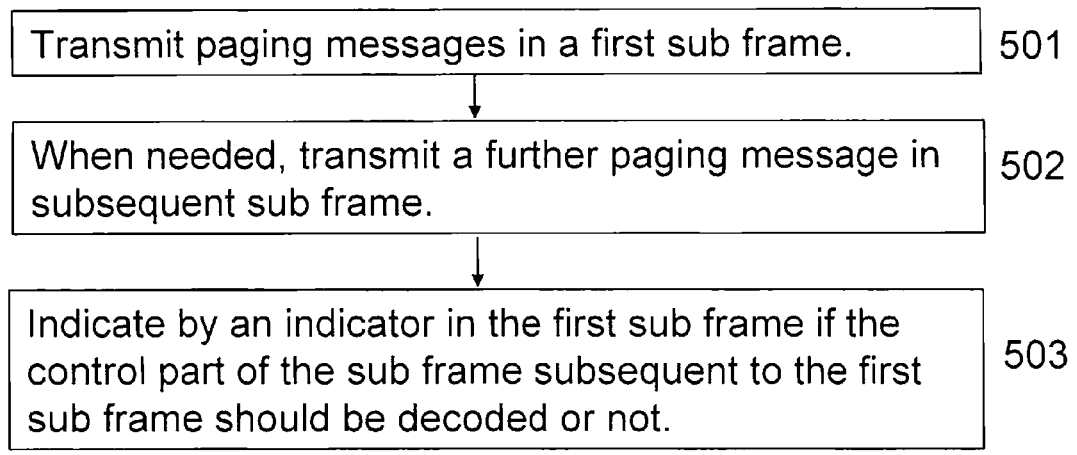
FIGS. 5 and 6 are flowcharts illustrating the methods for paging of the present invention.

More specifically and with reference to FIG. 5, the present invention relates to a method for paging for a radio access network supporting discontinuous reception, using sub frames for the paging which consist of a control part and a data part. The method according to one embodiment comprises the steps:
501. Transmit paging messages in the data part of a first sub frame.
502. Transmit a further paging message in the data part of a sub frame subsequent to the first sub frame, if the data rate of the first sub frame is not high enough for transmitting all the paging messages (overflow situation).
503. Indicate by an indicator in the first sub frame if the control part of the sub frame subsequent to the first sub frame should be decoded or not.

In step 503, the indicator only indicates if the control part of the subsequent sub frame should be read, as there is an indicator—the P-RNTI—in the control part that in turn indicates if the data part comprises paging messages or not, as described above with reference to FIG. 4.

Figure 6:
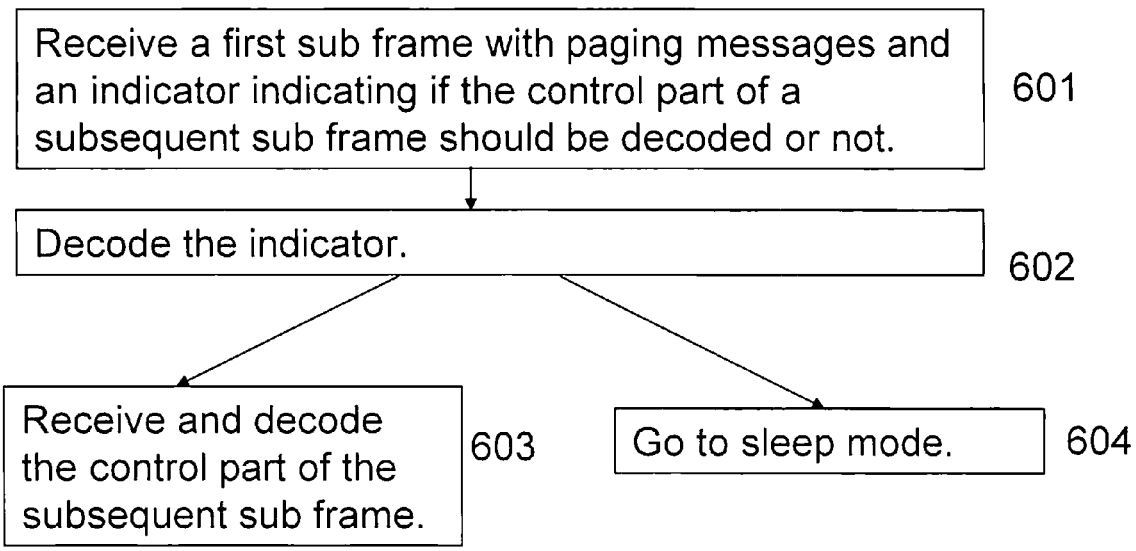

Furthermore the present invention relates to a method for paging for a UE of a radio access network supporting discontinuous reception, using sub frames for the paging which consist of a control part and a data part. The method according to one embodiment is illustrated in the flowchart of FIG. 6 and comprises the steps:
601. Receive a first sub frame comprising paging messages in the data part and an indicator indicating if the control part of a sub frame subsequent to the first sub frame should be decoded or not.
602. Decode the indicator.
603. Receive and decode the control part of the sub frame subsequent to the first sub frame if the indicator indicates that said control part should be decoded.
604. Go to sleep mode if the indicator indicates that the control part of the sub frame subsequent to the first sub frame should not be decoded.

Figure 7:
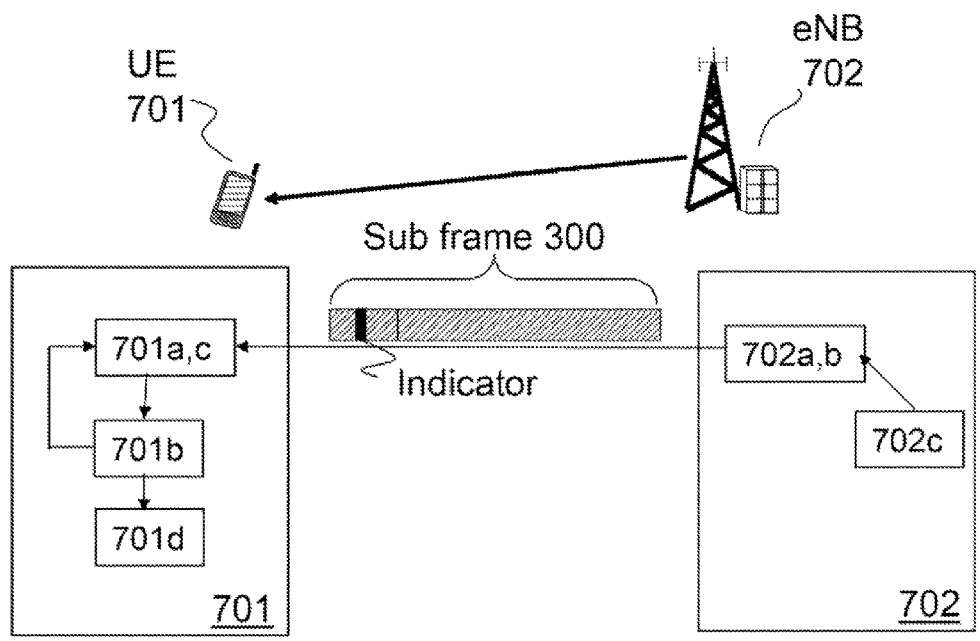
FIG. 7 illustrates schematically the arrangements according to embodiments of the present invention.

Furthermore, FIG. 7 illustrates a part of a radio access network shown in FIG. 1 comprising, by means of example, one UE 701 connected to a eNB 702. Schematically illustrated in FIG. 7 and according to one embodiment, the arrangement in the eNB 702 comprises means for transmitting 702*a* paging messages in the data part of a first sub frame, and means for transmitting 702*b* a further paging message in the data part of a sub frame subsequent when needed, i.e. when the data rate of the first sub frame is not high enough for transmitting all the paging messages. It also comprises means for indicating 702*c* by an indicator in the first sub frame if the control part of the sub frame subsequent to the first sub frame should be decoded or not. Also illustrated in FIG. 7 is the arrangement in the UE 701, which comprises means for receiving 701*a* a first sub frame comprising paging messages in the data part and an indicator indicating if the control part of a sub frame subsequent to the first sub frame should be decoded or not, means for decoding 701*b* said indicator, means for receiving and decoding 701*c* the control part of the subsequent sub frame, and means for going to sleep mode 701*d*.

The indicator, indicating if the control part of a sub frame subsequent to the first sub frame should be decoded or not, can be defined in different ways. According to one embodiment, the indicator is contained in the control part of the sub frame. It may comprise a direct indication e.g. a single explicit bit (or more than one bit) indicating if the control part of the subsequent sub frame should be decoded or if the UE should go to sleep.

A special case of this embodiment is to use the existing P-RNTI as the indicator. This implies that a P-RNTI in the control part of a sub frame explicitly means that the data part of the current sub frame comprises paging messages and should be decoded, and implicitly means that the control part of the subsequent sub frame should be decoded. This also implies that the control part of the sub frame subsequent to a sub frame comprising paging messages will always be read, either this is needed or not. In this case it is when decoding the control part of the subsequent sub frame that it will be known if the data part of the subsequent sub frame contains paging messages or not. If the subsequent sub frame comprises paging messages, the control part of that subsequent sub frame will also include a P-RNTI, and the control part of yet another subsequent sub frame will be read. The advantage of such an embodiment is that there is no need to define a new specific indicator.

Another variant to this embodiment is to define an alternative P-RNTI, here called Paging Continuation RNTI=PC-RNTI, as the indicator. Such an indicator would explicitly indicate the presence of paging messages in the data part of the current sub frame (which is the same function as the conventional P-RNTI) but will also explicitly indicate that the next sub frame contains a continuation of the paging messages. The advantage of using PC-RNTI as indicator rather than P-RNTI as described above, is that it avoids the unnecessary reading of the control part of one last sub frame which does not contain any paging messages.

According to yet another embodiment, the indicator is contained in the data part of the sub frame rather than in the control part. With this embodiment the advantage is that the indicator can be defined wherever suitable in the data part.

It should be noted that even if the terms eNB, PDCCH and P-RNTI is used, the present invention is applicable to all radio base stations having a similar functionality as the eNB in the E-UTRAN. Thus the present invention is not limited to E-UTRAN but can be used in any radio access network having a similar architecture and paging method.

The above described embodiments of the invention are intended to be examples only. Alterations, modification, and variations may be effected to particular embodiments by those skilled in the art without departing from the scope of the invention, which is defined by the accompanying claims.

What is claimed is:

1. A method performed by a base station for paging in a radio access network providing communication services to at least one user equipment, wherein the network and the user equipment support discontinuous reception, and wherein a sub frame used for paging messages comprises a control part and a data part, said method comprising the steps of:
the base station transmitting paging messages in the data part of a first sub frame;
the base station transmitting a further paging message in the data part of a next subsequent sub frame subsequent to the first sub frame, when the data rate of the first sub frame is not high enough for transmitting all paging messages, wherein the first sub frame and the next subsequent sub frame are included in a larger data frame, wherein the data frame includes a plurality of sub frames, and one or more of the plurality of sub frames within the data frame are used for paging messages; and
the base station indicating by placing an indicator in the first sub frame, whether the control part of the next subsequent sub frame subsequent to the first sub frame should be decoded;
wherein when overflow paging data is included in the next subsequent sub frame subsequent to the first sub frame, the indicator indicates the control part of the next subsequent sub frame subsequent to the first sub frame should be decoded, and in response, the UE is caused to extend a duration of an awake period to decode the control part of the next subsequent sub frame within the data frame and read the overflow paging data; and
wherein when overflow paging data is not included in the next subsequent sub frame subsequent to the first sub frame, the indicator indicates the control part of the next subsequent sub frame subsequent to the first sub frame should not be decoded, and in response, the user equipment returns to sleep mode without extending the duration of the awake period.

2. The method according to claim 1, wherein the indicator comprises at least one bit of the control part.

3. The method according to claim 2, wherein the indicator is the paging radio network temporary identifier (P-RNTI).

4. The method according to claim 2, wherein the indicator is an alternative P-RNTI, identifying that both the first sub frame and the next subsequent sub frame comprise paging messages.

5. The method according to claim 1, wherein the indicator comprises at least one bit of the data part.

6. A method performed by a user equipment for receiving and processing paging messages in a radio access network, wherein the user equipment and the network support discontinuous reception, and wherein a sub frame used for paging messages comprises a control part and a data part, said method comprising the steps of:
the user equipment receiving a first sub frame comprising paging messages in the data part and an indicator indicating whether the control part of a next subsequent sub frame subsequent to the first sub frame should be decoded, wherein the first sub frame and the next subsequent sub frame are included in a larger data frame, wherein the data frame includes a plurality of sub frames, and one or more of the plurality of sub frames within the data frame are used for paging messages;
the user equipment decoding the indicator;
the user equipment receiving the control part of the next subsequent sub frame subsequent to the first sub frame, and extending a duration of an awake period to decode the control part of the next subsequent sub frame subsequent to the first sub frame when the indicator indicates that the control part of the next subsequent sub frame subsequent to the first sub frame should be decoded; and
the user equipment going into sleep mode without extending the duration of the awake period when the indicator indicates that the control part of the next subsequent sub frame subsequent to the first sub frame should not be decoded.

7. The method according to claim 6, wherein the indicator comprises at least one bit of the control part.

8. The method according to claim 7, wherein the indicator is the paging radio network temporary identifier (P-RNTI).

9. The method according to claim 7, wherein the indicator is an alternative P-RNTI, identifying that both the first sub frame and the next subsequent sub frame comprise paging messages.

10. The method according to claim 6, wherein the indicator comprises at least one bit of the data part.

11. A network node of a radio access network providing communication services to at least one user equipment, wherein the network and the user equipment support discontinuous reception, and wherein a sub frame used for paging messages comprises a control part and a data part, said network node comprising:
means for transmitting paging messages in the data part of a first sub frame;
means for transmitting a further paging message in the data part of a next subsequent sub frame subsequent to the first sub frame when the data rate of the first sub frame is not high enough for transmitting all paging messages, wherein the first sub frame and the next subsequent sub frame are included in a larger data frame, wherein the data frame includes a plurality of sub frames, and one or more of the plurality of sub frames within the data frame are used for paging messages; and means for indicating by placing an indicator in the first sub frame, whether the control part of the next subsequent sub frame subsequent to the first sub frame should be decoded;

wherein when overflow paging data is included in the next subsequent sub frame subsequent to the first sub frame, the indicator indicates the control part of the next subsequent sub frame subsequent to the first sub frame should be decoded, and in response, the UE is caused to extend a duration of an awake period to decode the control part of the next subsequent sub frame within the data frame and read the overflow paging data; and wherein when overflow paging data is not included in the next subsequent sub frame subsequent to the first sub frame, the indicator indicates the control part of the next subsequent sub frame subsequent to the first sub frame should not be decoded, and in response, the user equipment returns to sleep mode without extending the duration of the awake period.

12. The network node according to claim 11, wherein the indicator comprises at least one bit of the control part.

13. The network node according to claim 12, wherein the indicator is the paging radio network temporary identifier (P-RNTI).

14. The network node according to claim 12, wherein the indicator is an alternative P-RNTI, identifying that both the first sub frame and the next subsequent sub frame comprise paging messages.

15. The network node according to claim 11, wherein the indicator comprises at least one bit of the data part.

16. A user equipment of a radio access network, wherein the user equipment and the network support discontinuous reception, and wherein a sub frame used for paging messages comprises a control part and a data part, said user equipment comprising:

means for receiving a first sub frame comprising paging messages in the data part and an indicator indicating whether the control part of a next subsequent sub frame subsequent to the first sub frame should be decoded, wherein the first sub frame and the next subsequent sub frame are included in a larger data frame, wherein the data frame includes a plurality of sub frames, and one or more of the plurality of sub frames within the data frame are used for paging messages;

means for decoding the indicator;

means for receiving the control part of the next subsequent sub frame subsequent to the first sub frame, and extending a duration of an awake period to decode the control part of the next subsequent sub frame subsequent to the first sub frame when the indicator indicates that the control part of the next subsequent sub frame subsequent to the first sub frame should be decoded, and means for going into sleep mode without extending the duration of the awake period when the indicator indicates that the control part of the next subsequent sub frame subsequent to the first sub frame should not be decoded.

17. The user equipment according to claim 16, wherein the indicator comprises at least one bit of the control part.

18. The user equipment according to claim 17, wherein the indicator is the paging radio network temporary identifier (P-RNTI).

19. The user equipment according to claim 17, wherein the indicator is an alternative P-RNTI, identifying that both the first sub frame and the next subsequent sub frame comprise paging messages.

20. The user equipment according to claim 16, wherein the indicator comprises at least one bit of the data part.

* * * * *

UNITED STATES PATENT AND TRADEMARK OFFICE
CERTIFICATE OF CORRECTION

| | | |
|---|---|---|
| PATENT NO. | : 8,886,232 B2 | Page 1 of 1 |
| APPLICATION NO. | : 12/680328 | |
| DATED | : November 11, 2014 | |
| INVENTOR(S) | : Müller et al. | |

It is certified that error appears in the above-identified patent and that said Letters Patent is hereby corrected as shown below:

On the title page item 87, under "PCT Pub. No.:", in Column 1, Line 1, delete "WO2006/138625" and insert -- WO2009/041880 --, therefor.

On the title page item 87, under "PCT Pub. Date:", in Column 1, Line 1, delete "Dec. 28, 2006" and insert -- April 2, 2009 --, therefor.

In the specification

In Column 2, Line 33, delete "there" and insert -- their --, therefor.

Signed and Sealed this
Twelfth Day of April, 2016

Michelle K. Lee
*Director of the United States Patent and Trademark Office*